(12) United States Patent (10) Patent No.: US 8,798,812 B2
Ryu et al. (45) Date of Patent: Aug. 5, 2014

(54) THREE-DIMENSIONAL DIGITAL MAP

(75) Inventors: Kwang Su Ryu, Gyeongsangnam-Do (KR); Jin Bok Kim, Gyeongsangnam-Do (KR); Gyeong Sik Yang, Gyeongsangnam-Do (KR)

(73) Assignee: Korea Aerospace Industries, Ltd., Gyeongsangnam-Do (KR)

( * ) Notice: Subject to any disclaimer, the term of this patent is extended or adjusted under 35 U.S.C. 154(b) by 346 days.

(21) Appl. No.: 13/280,494

(22) Filed: Oct. 25, 2011

(65) Prior Publication Data

US 2013/0090787 A1 Apr. 11, 2013

(30) Foreign Application Priority Data

Oct. 7, 2011 (KR) ........................ 10-2011-0102318

(51) Int. Cl.
*G01C 23/00* (2006.01)
*G05D 1/00* (2006.01)
*G06F 7/00* (2006.01)
*G06F 17/00* (2006.01)

(52) U.S. Cl.
USPC ................. 701/3; 701/14; 701/120; 701/301; 701/445; 701/448

(58) Field of Classification Search
USPC ......... 701/3, 14, 120, 301, 445, 448; 345/425
See application file for complete search history.

(56) References Cited

U.S. PATENT DOCUMENTS

| | | | | |
|---|---|---|---|---|
| 5,892,462 A * | 4/1999 | Tran | .............................. | 340/961 |
| 6,005,581 A * | 12/1999 | Gjullin | .......................... | 345/582 |
| 6,088,654 A * | 7/2000 | Lepere et al. | ................. | 701/301 |
| 6,130,705 A * | 10/2000 | Lareau et al. | ................. | 348/144 |
| 6,317,690 B1 * | 11/2001 | Gia | ............................... | 701/301 |
| 6,401,038 B2 * | 6/2002 | Gia | ............................... | 701/301 |
| 6,496,760 B1 * | 12/2002 | Michaelson et al. | ............. | 701/3 |
| 6,538,581 B2 * | 3/2003 | Cowie | .......................... | 340/961 |
| 7,010,398 B2 * | 3/2006 | Wilkins et al. | .................... | 701/3 |
| 7,030,780 B2 * | 4/2006 | Shiomi et al. | ................. | 340/961 |
| 7,352,292 B2 * | 4/2008 | Alter et al. | .................... | 340/945 |
| 7,920,943 B2 * | 4/2011 | Campbell et al. | ................. | 701/9 |
| 8,049,644 B1 * | 11/2011 | Oehlert et al. | ................ | 340/970 |
| 8,509,965 B2 * | 8/2013 | Lin | .................... | 701/3 |
| 2001/0013836 A1 * | 8/2001 | Cowie | .......................... | 340/961 |
| 2001/0023390 A1 * | 9/2001 | Gia | ............................... | 701/301 |
| 2002/0180636 A1 * | 12/2002 | Lin et al. | .................. | 342/357.14 |
| 2004/0015274 A1 * | 1/2004 | Wilkins et al. | .................... | 701/3 |
| 2005/0273254 A1 * | 12/2005 | Malchi et al. | ................. | 701/207 |
| 2007/0010965 A1 * | 1/2007 | Malchi et al. | ................. | 702/151 |
| 2007/0127012 A1 * | 6/2007 | Kornblum | ................ | 356/139.01 |
| 2009/0326893 A1 * | 12/2009 | Neely | ............................... | 703/8 |
| 2010/0070176 A1 * | 3/2010 | Feyereisen et al. | ........... | 701/211 |
| 2011/0137492 A1 * | 6/2011 | Sahasrabudhe et al. | .......... | 701/3 |

* cited by examiner

*Primary Examiner* — Khoi Tran
*Assistant Examiner* — Jorge Peche
(74) *Attorney, Agent, or Firm* — David S. Resnick; David F. Crosby

(57) ABSTRACT

Disclosed herein is a three-dimensional (3D) digital map system for implementing a navigation and ground collision preventing method using 3D terrain information. The 3D digital map system includes a terrain referenced navigation module configured to receive data from EGI (Embedded GPS/INS), a radio-altimeter (RALT) and a map database, corrects the data to perform accurate navigation computation, and outputs the corrected data, a collision avoidance warning module configured to generate a warning against collision of an aircraft with the ground or an obstacle using the corrected data, a 3D terrain database and an obstacle database, a terrain following module configured to generate a terrain following trajectory of the aircraft using the same information, and a Passive Ranging module configured to receive the 3D terrain database and line-of-sight (LOS) information of a target and calculate distance and position information of the target located on the ground.

1 Claim, 9 Drawing Sheets

THREE-DIMENSIONAL DIGITAL MAP

CROSS-REFERENCE TO RELATED APPLICATIONS

This application claims priority to Korean Patent Application No. 10-2011-0102318 filed on Oct. 7, 2011 the contents of which are incorporated herein by reference in its entirety.

BACKGROUND OF THE INVENTION

1. Field of the Invention

The present invention relates to a three-dimensional (3D) digital map system, and particularly, to a 3D digital map system manufactured to optimally implement a 3D map with respect to a supersonic advanced trainer (T-50).

2. Description of the Related Art

Most aircraft accidents are caused by aircraft personnel. 70% of these accidents are due to the pilot error. More than half of these accidents are related to Controlled Flight Into Terrain (CFIT).

CTIF refers to an accident in which an aircraft is unintentionally flown into the ground, an obstacle or water under pilot control or an accident in which an aircraft collides with the ground or the surface of sea through inattention of the pilot while the aircraft is normally operated.

A Ground Proximity Warning System (GPWS) which may be used to prevent collision with the ground was developed in the early 1970s and has been generally mounted and used in all aircrafts of United States by the Federal Aviation Administration (FAA) in 1975.

However, in the GPWS of the related art, since a radio-altimeter measures a distance between an aircraft and the ground, a terrain located under the aircraft is recognized, but an obstacle or terrain located in a flight direction or at the side of the aircraft is not recognized.

SUMMARY OF THE INVENTION

Therefore, the present invention has been made in view of the above problems, and it is an object of the present invention to provide a 3D digital map system for implementing a navigation and ground collision preventing method using 3D terrain information.

In accordance with the present invention, the above and other objects can be accomplished by the provision of a three-dimensional (3D) digital map system including a Terrain Referenced Navigation (TRN) module configured to receive data from EGI (Embedded GPS/INS), a radio-altimeter (RALT) and a map database, correct the data to perform accurate navigation computation, and output the corrected data, a Collision Avoidance Warning (CAW) module configured to generate a warning against collision of an aircraft with the ground or an obstacle using the corrected data, a 3D terrain database and an obstacle database, a Terrain Following (TF) module configured to generate a terrain following trajectory of the aircraft using the same information, and a Passive Ranging (PR) module configured to receive the 3D terrain database and line-of-sight (LOS) information of a target and calculate distance and position information of the target located on the ground.

The TRN module may include a data synchronization function configured to internally store information received from the EGI and the radio-altimeter through a time tag, a Bayesian filter configured to estimate a current latitude and longitude of the aircraft using the data synchronized by the data synchronization function and Digital Terrain Elevation data (DTED), a Kalman filter configured to receive the estimated latitude and longitude and correct the aircraft status data of the EGI, and a switch configured to check the estimation state of the Kalman filter and bypass the data of the EGI or output the data of the EGI corrected by the Kalman filter.

The CAW module may include an aircraft prediction trajectory generation module configured to receive maximum allowable load coefficient information output from a flight control module, a near terrain generation module configured to receive high-resolution satellite image terrain data stored in a Digital Moving Map (DMM) module, data of an obstacle database and data of an anti-air threat database, a search range setting module configured to receive the latitude, longitude, height and velocity of the aircraft and attitude information of the aircraft, which are output from a navigation system, set a search range, and output the information to the near terrain generation module or the aircraft prediction trajectory generation module, a terrain-and-trajectory comparison module configured to receive and analyze the data of the databases and the aircraft status output from the near terrain generation module and the aircraft prediction trajectory generation module, and a status recognition module configured to output various warnings according to the analyzed data of the databases and aircraft status.

The TF module may further include an excess thrust computation module configured to determine a maximum rate of climb, a constant-slope module for simplifying a terrain, and a moving average module considering a turn rate.

The PR module may further include a line-of-sight ranging module and a coordinate ranging module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
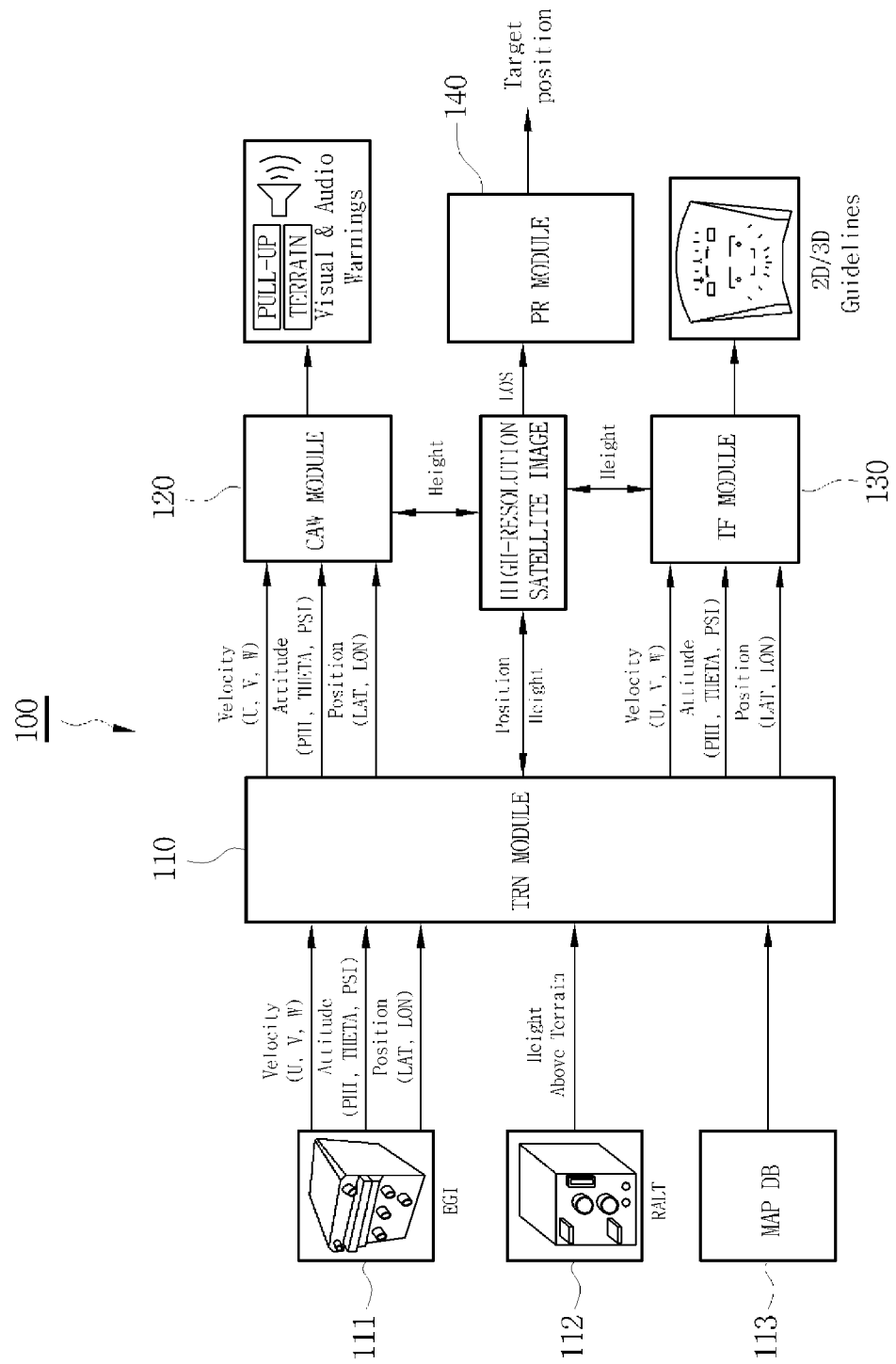
FIG. 1 is a block diagram showing the configuration of a three-dimensional (3D) digital map system according to the present invention.

Exemplary embodiments now will be described more fully hereinafter with reference to the accompanying drawings, in which exemplary embodiments are shown. The present invention may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the drawings, like reference numerals denote like elements. The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising" when used in this specification, specify the presence of stated components, steps, operations, and/or elements, but do not preclude the presence or addition of one or more other components, steps, operations, and/or elements.

FIG. 1 is a block diagram showing the configuration of a three-dimensional (3D) digital map system 100 according to the present invention.

Referring to FIG. 1, the 3D digital map system 100 according to the present invention includes a Terrain Referenced Navigation (TRN) module 110, a Collision Avoidance Warning (CAW) module 120, a Terrain Following (TF) module 130, and a Passive Ranging (PR) module 140.

First, the TRN module 110 serves to receive data from EGI (Embedded GPS/INS) 111, a radio-altimeter (RALT) 112 and a map database 113, correct the data to perform accurate navigation computation and send the corrected data to the CAW module 120, the TF module 130 and the PR module 140.

The CRW module 120 serves to generate a warning against collision of an aircraft with the ground or an obstacle using the corrected data, a 3D terrain database, an obstacle database, etc.

The TF module 130 serves to generate a terrain following trajectory of the aircraft using the same information.

The PR module 140 serves to receive information about a Line Of Sight (LOS) of a target and a terrain database and calculate distance and position information of the target.

As shown in FIG. 1, the TRN module 110 sends navigation information obtained by correcting external data using the terrain database, such as velocity, attitude and position, to the CAW module 120, the TF module 130 and the PR module 140. The modules output respective result values using the received information.

The TRN module 110 used in the 3D digital map system 100 according to the present invention will now be described in greater detail with reference to FIGS. 2 and 3.

Figure 2:
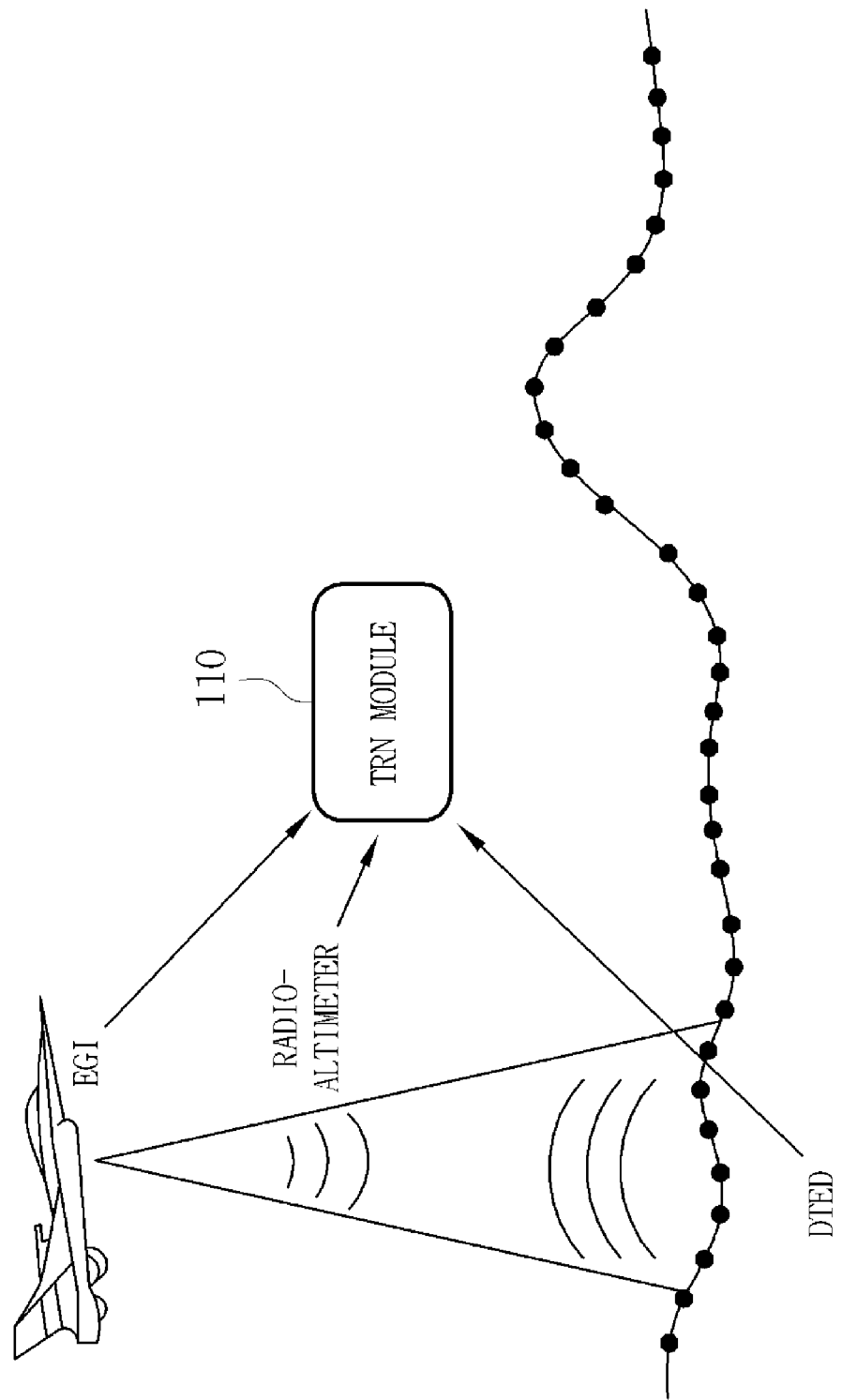
FIG. 2 is a diagram showing the outline of a Terrain Referenced Navigation (TRN) module.

FIG. 2 is a diagram showing the outline of the TRN module 110. Referring to FIG. 2, the TRN module 110 measures height data using the radio-altimeter 112 and measures terrain data using Digital Terrain Elevation Data (DTED), thereby improving the performance of the EGI 111. That is, the current position of the aircraft is estimated using the height data of the radio-altimeter 112 and the EGI 111 based on the DTED. As the combination of a GPS and an INS sensor complements each other's shortcoming, if a Digital Terrain System (DTS) is combined with the existing sensor such as a radio-altimeter through a Kalman filter, it is possible to acquire a navigation result with high accuracy and low drift without being sensitive to a variation in external environment. The TRN module 110 may perform such a function to perform a collision avoidance function with high accuracy and high reliability.

Figure 3:
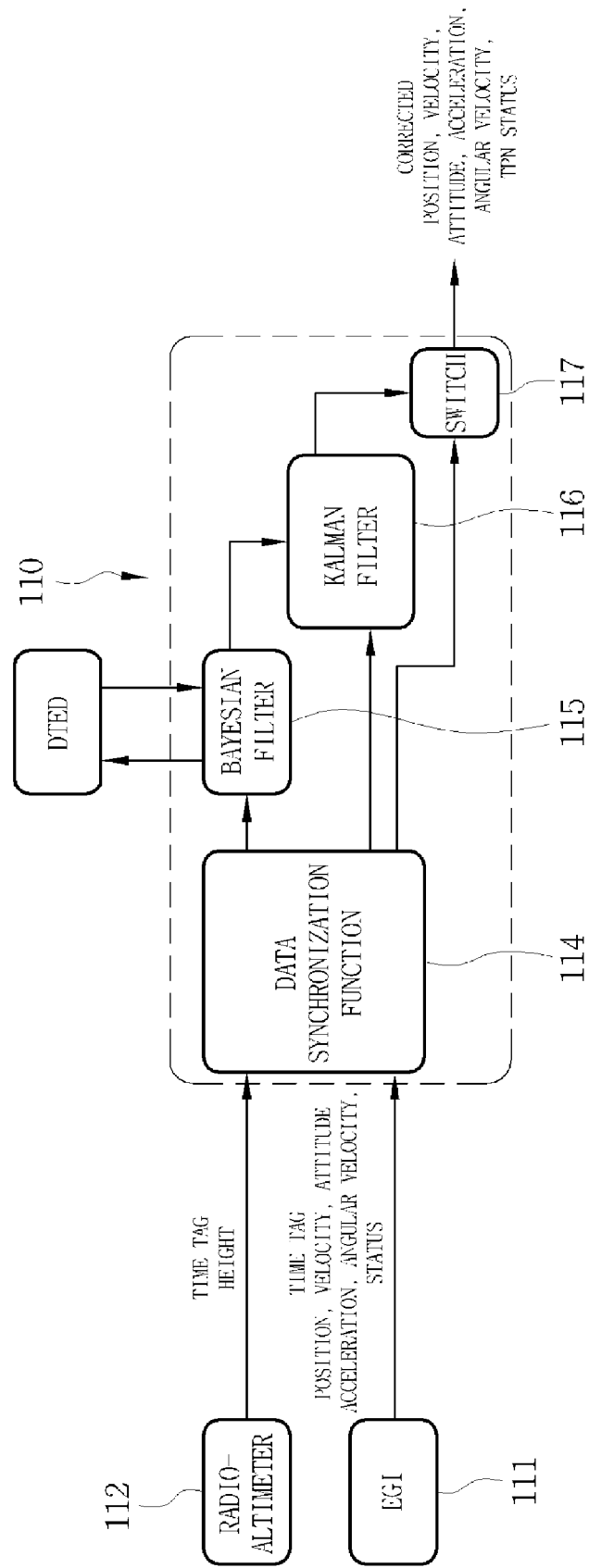
FIG. 3 is a block diagram showing the configuration of the TRN module.

FIG. 3 is a block diagram showing the configuration of the TRN module 110.

Referring to FIG. 3, the TRN module 110 includes data synchronization function 114, Bayesian filter 115, Kalman filter 116 and switch 117.

The data synchronization function internally stores information received from the EGI 111 and the radio-altimeter 112 through a time tag. The Bayesian filter 115 estimates the current latitude and longitude of the aircraft using the synchronized data and the DTED. The estimated latitude and longitude are inputted to the Kalman filter 116 which corrects the aircraft status data of the EGI 111. Finally, the switch 117 checks the estimation state of the Kalman filter 116 and bypasses the data of the EGI 111 or outputs the data of the EGI 111 corrected by the Kalman filter 116.

The CAW module 120 used in the 3D digital map system 100 according to the present invention will be described in greater detail with reference to FIGS. 4 and 5.

Figure 4:
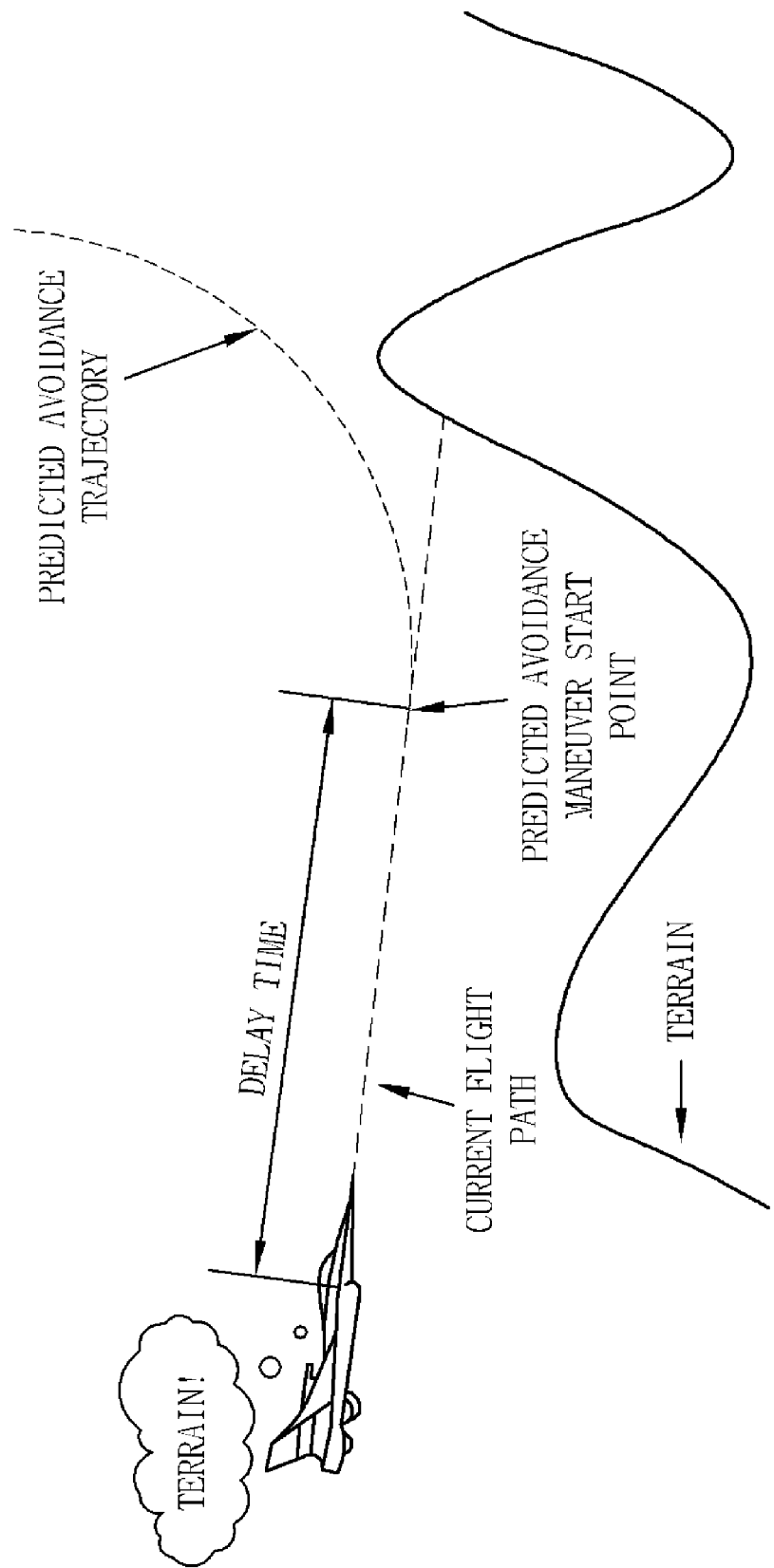
FIG. 4 is a diagram showing the outline of a Collision Avoidance Warning (CAW) module.

FIG. 4 is a diagram showing the outline of the CAW module 120. Referring to FIG. 4, the CAW module 120 of the present invention serves to predict the future position of the aircraft using terrain data if the aircraft flies for a terrain, outputs an appropriate warning if danger is present, and enables the pilot to avoid collision. At this time, terrain data, a delay time and a kinetic property of the aircraft are considered.

Figure 5:
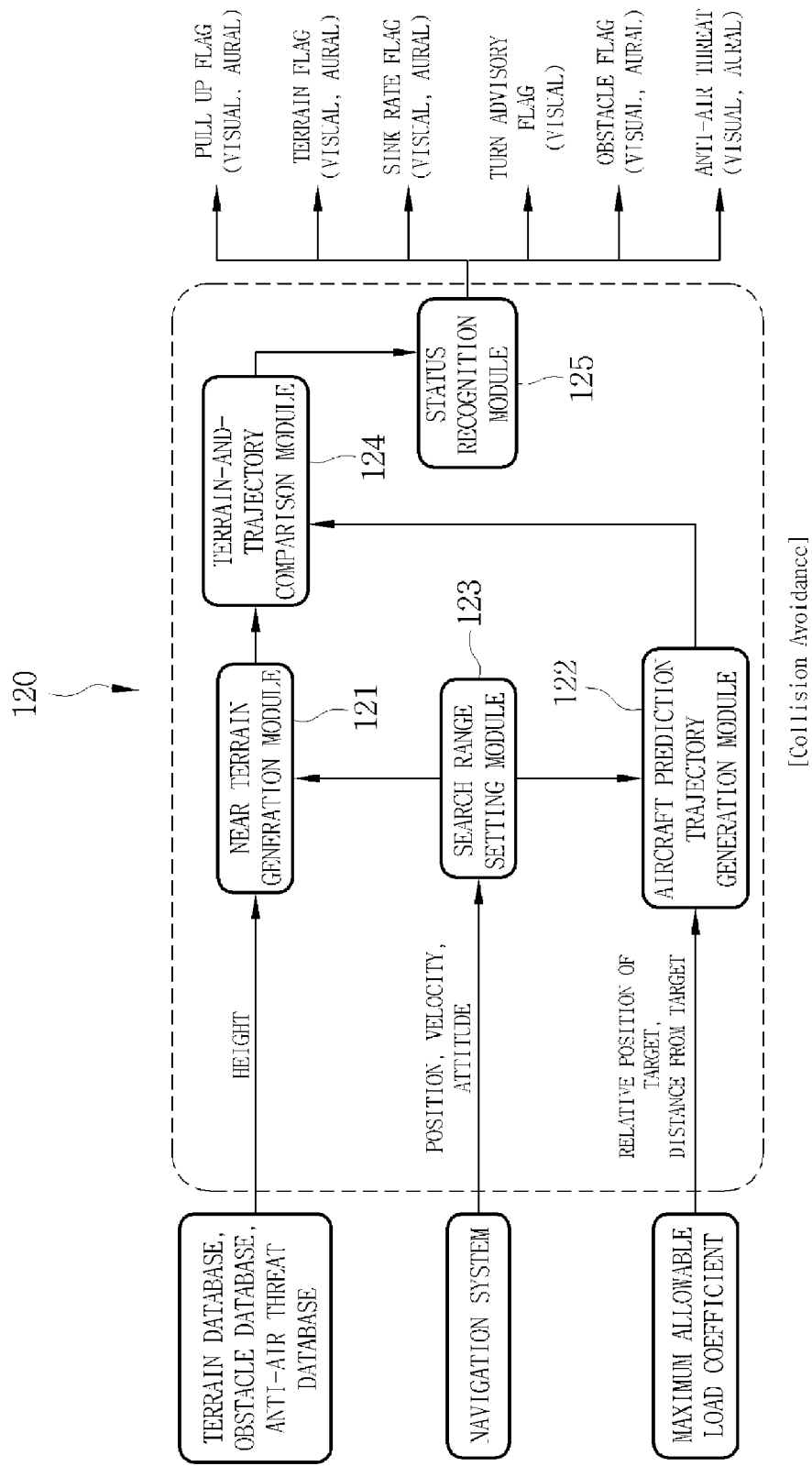
FIG. 5 is a block diagram showing the configuration of the CAW module.

FIG. 5 is a block diagram showing the configuration of the CAW module 12.

Referring to FIG. 5, the CAW module 120 includes a near terrain module 121, a search range setting module 123, an aircraft prediction trajectory generation module 122, a terrain-and-trajectory comparison module 124 and a status recognition module 125.

First, the latitude, longitude, height and velocity of the aircraft and attitude information of the aircraft, which are outputted from a navigation system, are inputted to the search range setting module 123 so as to set a search range and the search range is inputted to the near terrain generation module 121 or the aircraft prediction trajectory generation module 122. Maximum allowable load coefficient information outputted from a flight control module is directly inputted to the aircraft prediction trajectory generation module 122, and high-resolution satellite image terrain data stored in a Digital Moving Map (DMM) module, data of an obstacle database and data of an anti-air threat database are directly inputted to the near terrain generation module 121. Preferably, a turn rate of the aircraft for determining whether a threat of a terrain is present in turning maneuver and aircraft performance data such as a turning radius may be inputted. The terrain-and-trajectory comparison module 124 receives and analyzes the data of the databases and the aircraft status output from the near terrain generation module 121 and the aircraft prediction trajectory generation module 122 and outputs the analyzed result to the status recognition module 125. The status recognition module 125 outputs various warnings according to situations.

The various warnings include a sinkrate pull-up warning output when collision with a terrain is imminent due to an excessive sink rate, a pull-up warning output when a threat of collision with a front terrain is present, a terrain warning generated when a near terrain is present in an aircraft velocity vector direction during a certain time or when a terrain is present at a certain height under the flight direction of the aircraft. In addition, a sinkrate warning generated when an excessive sink rate is generated is further included.

The pull-up warning determines whether or not terrains located at the right and left sides of the aircraft pose a threat to aircraft maneuver and generates a recommended path for avoiding collision if a path for enabling the aircraft to safely turn round a terrain to avoid collision with the terrain is present. If the height of a terrain located at one side of the aircraft is high and maneuvering of the aircraft to that side is dangerous, a message for guiding the aircraft to fly for a safe side is outputted.

If an obstacle higher than an aircraft prediction trajectory is present, an obstacle warning is outputted. Each terrain collision warning and an obstacle collision warning includes predicted collision time information. The sinkrate-based warning, the pull-up warning and the obstacle warning output a predicted terrain collision time and a predicted obstacle collision time. The obstacle warning may output relative azimuth information of an obstacle which poses a collision threat to the aircraft in the flight direction of the aircraft. Even with respect to an anti-air threat, an approach warning and a threat warning are outputted according to the approaching degree of the aircraft, thereby increasing pilot safety.

The TF module 130 used in the 3D digital map system 100 according to the present invention will be described in greater detail with reference to FIGS. 6 to 8.

Figure 6:
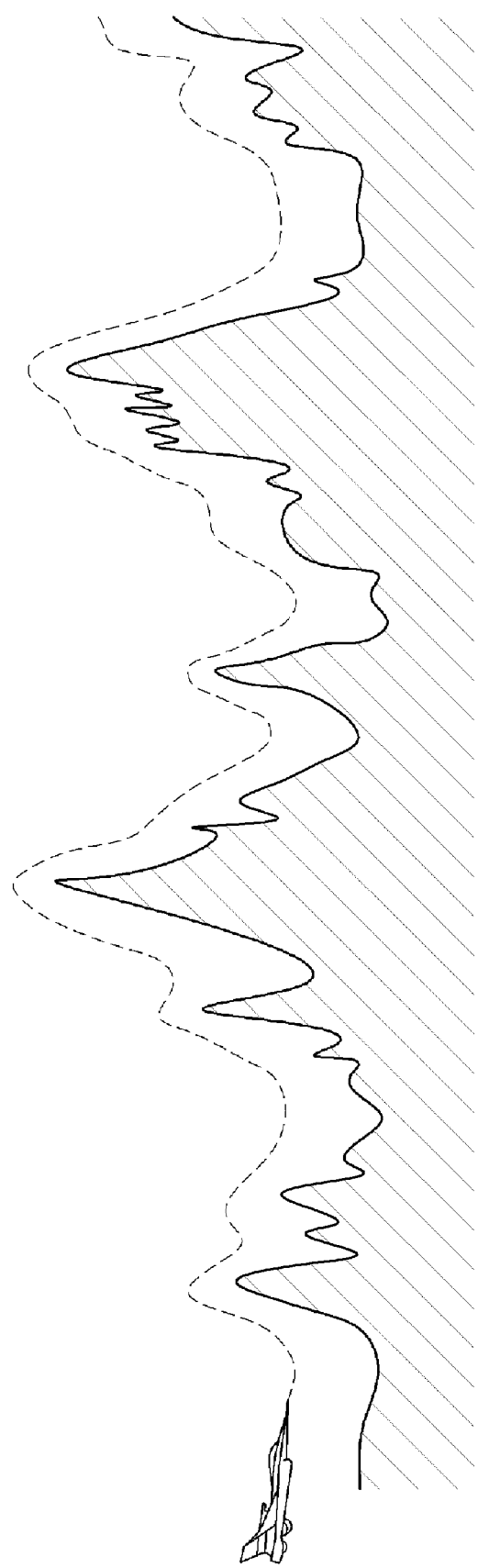
FIG. 6 is a diagram showing the outline of a Terrain Following (TF) module.

FIG. 6 is a diagram showing the outline of the TF module 130. Terrain following refers to technology in which an aircraft flies close to a terrain in order to avoid enemy radar. In order to prevent the aircraft from colliding with the ground, a flight path is provided to a pilot. In order to provide such a path, first, terrain information is acquired. A method of acquiring the terrain is divided into a radar terrain following (RTF) method and a database terrain following (DBTF) method. The RFT method acquires peripheral terrain information in real time using radar mounted in the aircraft, which is used not only in the TF module 130 but also in the TRN module 110 and the CAW module 120. However, recently, the DBTF method of storing and using terrain information as an electronic file has been used. Since terrain search is not performed in the DBTF method, the DBTF method is simply performed with a reduced computational amount.

Figure 7:
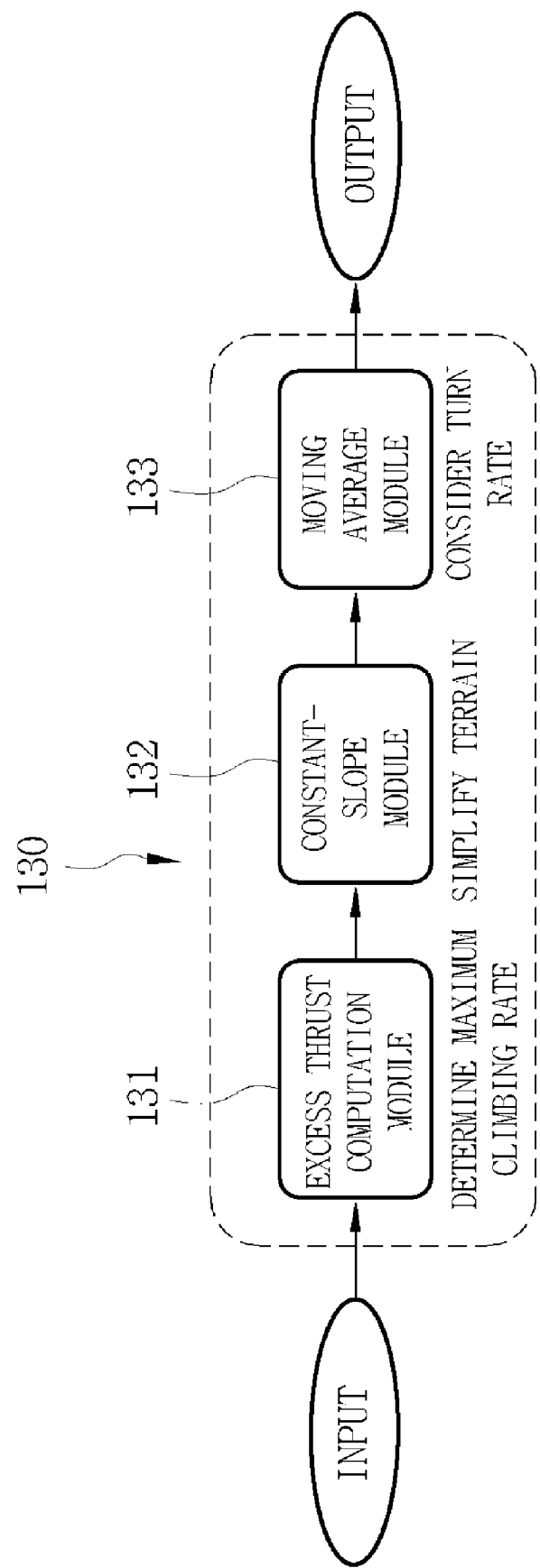
FIG. 7 is a block diagram showing the TF module.

FIG. 7 is a block diagram showing the TF module 130.

Referring to FIG. 7, the TF module 130 includes an excess thrust computation module 131 for determining the maximum climbing angle, a constant-slope module 132 for simplifying a terrain, and a moving average module 133 considering a turn rate.

Figure 8:
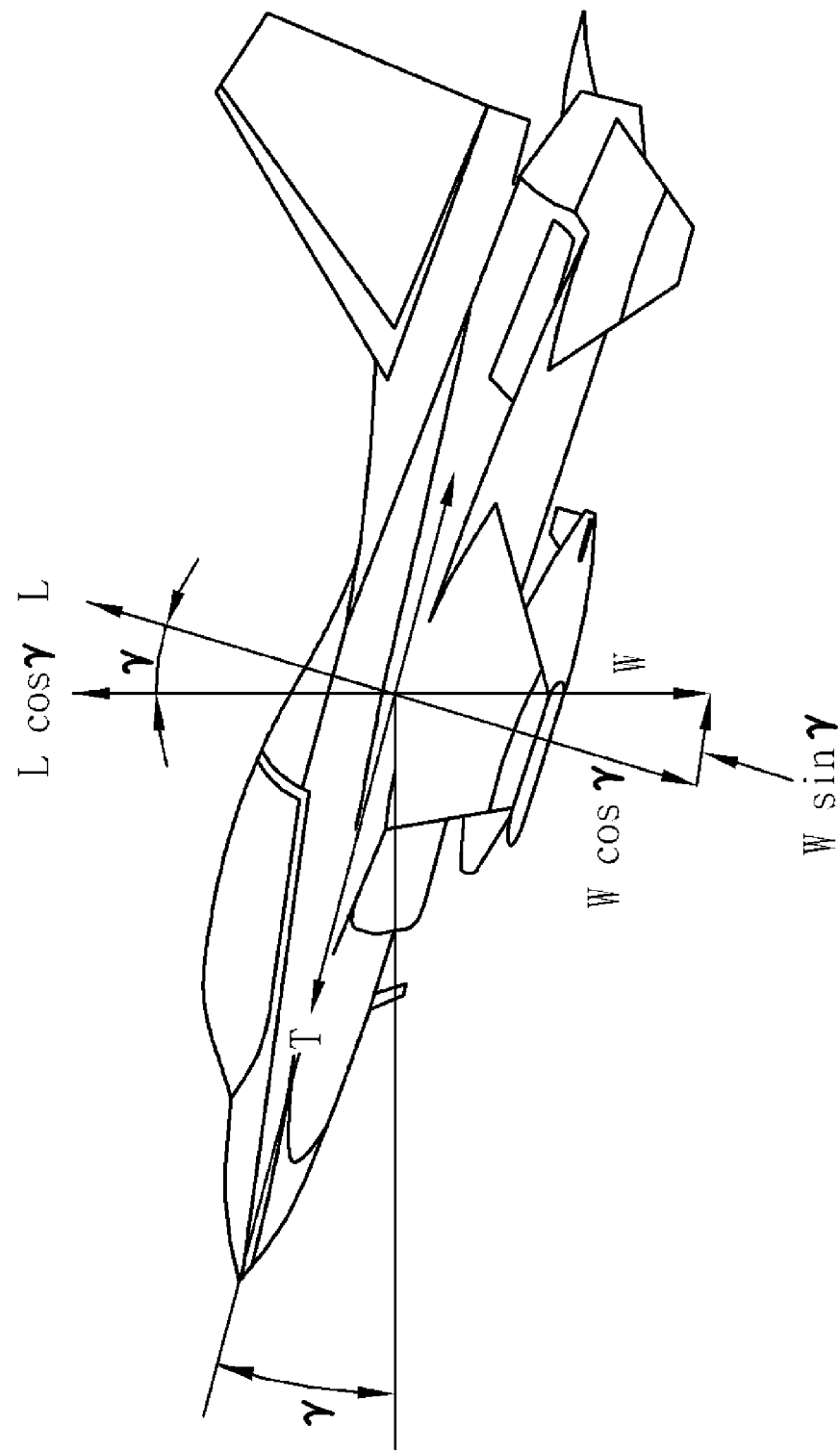
FIG. 8 is a diagram showing force applied to an aircraft.

FIG. 8 is a diagram showing force applied to an aircraft.

Figure 9:
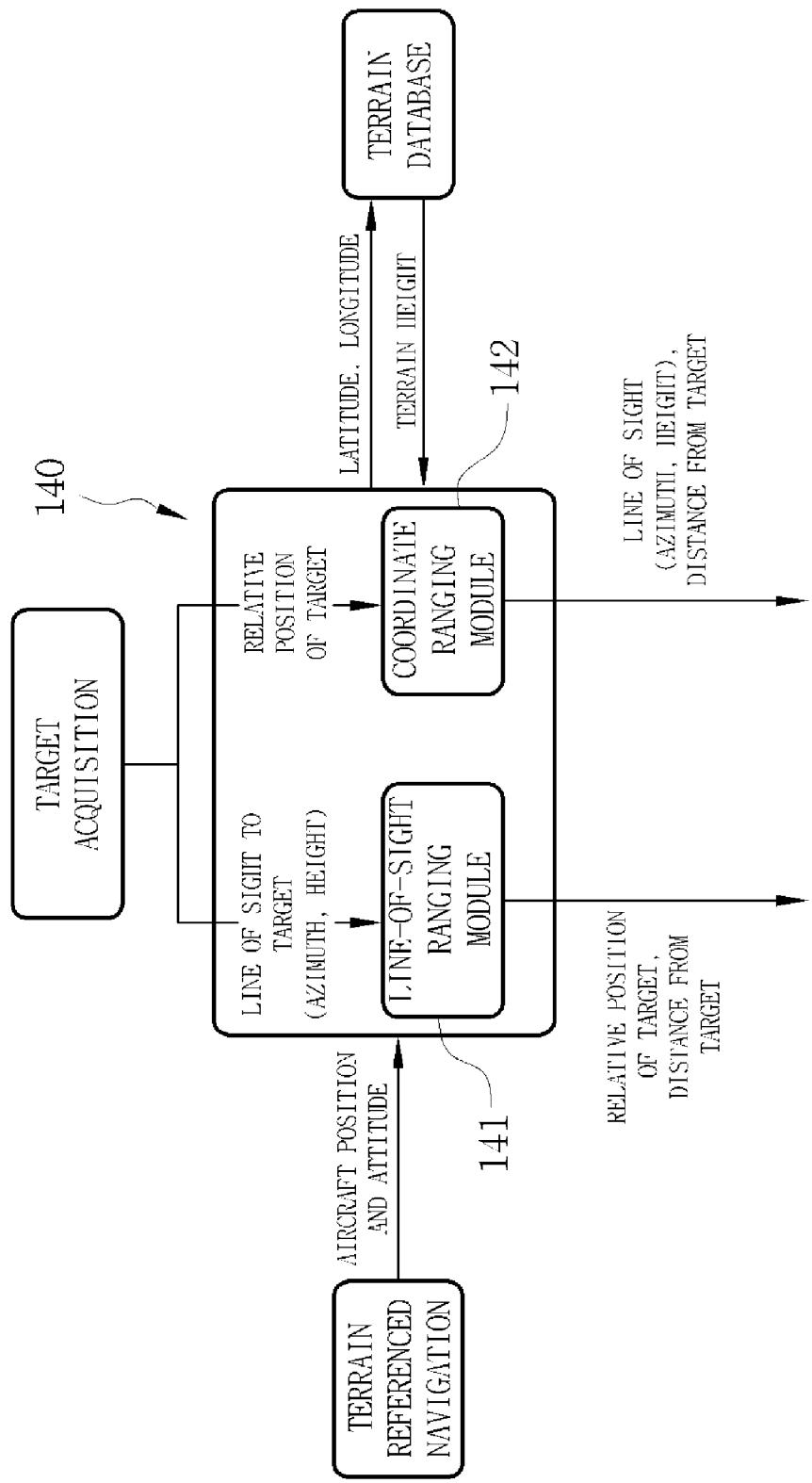
FIG. 9 is a block diagram showing the configuration of a Passive Ranging (PR) module.

Referring to FIG. 8, in order to enable an aircraft to climb while maintaining a constant velocity, more thrust is necessary. Accordingly, in order to detect a rate of climb for maintaining a constant velocity, an excess thrust curve is used. A velocity-thrust graph is known as aircraft characteristics and a table for excess thrust and velocity is made and is used. Gravity, lift force, thrust and drag force are applied to the aircraft as shown in FIG. 9. When the aircraft climbs, a partial component of gravity is applied in the same direction as drag force and thus more thrust is necessary in order to maintain velocity. In order to increase a climbing angle, more thrust is necessary. However, if thrust is not applied, the velocity is gradually decreased. Such a relationship depends on the engine performance of the aircraft and the amount of thrust which may be generated according to the velocity of the aircraft may be computed.

Next, the constant-slope module 132 will be described. An actual terrain is very complicated. If the aircraft follows the actual terrain, it may be difficult for the aircraft to avoid a suddenly changing terrain. Accordingly, an operation for simplifying the original terrain as a terrain suitable for flight of the aircraft in consideration of aircraft performance is necessary. The constant-slope module 132 performs such a function. For example, if the terrain is simplified to a constant slope satisfying the climbing rate and the sink rate of the aircraft, the aircraft can always follow the terrain in any section. If it is assumed that the climbing rate and the sink rate are identical, in order to change the slope of the terrain to a desired value, the terrain may be simplified such that the difference between neighboring height values is only one step in all regions using a morphology operation which is an image processing method.

Next, the moving average module 133 will be described in detail. Even when the terrain is simplified through the morphology operation in consideration of the maximum climbing rate of the aircraft, the aircraft may not follow the trajectory, because a sharp vertex is present. It is difficult for the aircraft to follow the path in a sharp vertex section. Accordingly, a smooth curve satisfying the turn rate of the aircraft needs to be formed in the sharp vertex section. The moving average module 133 performs such a function. The moving average module 133 generally corrects a current value using previous data. Although delay occurs, as the previous data is used, the data used to generate the terrain following path are values all known by the constant-slope module. Accordingly, if the moving average is not performed only using the previous data but is performed using an identical number of previous data and next data on the basis of the current point of time, delay does not occur.

FIG. 9 is a block diagram showing the configuration of the PR module 140.

Referring to FIG. 9, the PR module 140 includes a line-of-sight ranging module 141 and a coordinate ranging module 142, which have opposite functions.

The PR module 140 is used for the purpose of supporting an armed system of a military aircraft and provides target information. In order to attack a target located on the ground, it is necessary to detect the accurate position of the target. In order to improve the stealth property of the aircraft, line-of-sight information of a target is measured using passive sensors mounted in the aircraft, such as helmet mounted sights, laser designators, forward-looking infrared radar (FLIR), infra-red search and track (IRST) and RF precision direction finding systems.

The PR module 140 serves to calculate the accurate position information and height of the target and the distance from the aircraft using the aircraft navigation data acquired using the TRN module 110, the passive sensor mounted in the aircraft and the digital terrain map data. The target information computed by the PR module 140 is transmitted to and used in an armed system, an aircraft sensor system or, another aircraft and a ground apparatus.

First, the line-of-sight ranging module 141 will be described in detail.

If only the status information of the aircraft acquired from the result of the TRN module 110 and the line-of-sight information of the target measured by the passive sensor are provided, since the distance between the aircraft and the target cannot be computed, the line-of-sight ranging module 141 may not calculate the accurate position of the target. However, if terrain information is further used, the distance between the aircraft and the target can be accurately computed and the accurate position of the target located on the ground can be calculated.

The line-of-sight ranging module 141 serves to detect the position information of the target using the position and attitude information of the aircraft, the line of sight between the aircraft and the target, and digital map data. The line-of-sight ranging module 141 compares the height information acquired using a geometrical relationship between the aircraft and the target and the height information acquired from the digital terrain map data and detects the accurate position and height of the target. If the position of the aircraft and the position of the target are detected, it is possible to compute the distance between the aircraft and the target.

The line of sight to the target is measured using a targeting pod mounted in the aircraft or a ground radar device or a helmet mounted sight device. The position, height and distance information of the target obtained by the line-of-sight ranging module 141 may be transmitted to and used in the targeting pod of the aircraft, an armed system or another aircraft.

Next, the coordinate ranging module 142 will be described in detail.

The coordinate ranging module 142 is used when the accurate position of a specific target is given and serves to determine a relative distance from the target, line-of-sight information of the target, or whether a direct line-of-sight vector is generated. The coordinate ranging module 142 gives aid to accurately provide information about access to the target and gives aid to access a dangerous region or a ground target without exposing the aircraft.

According to the present invention, it is possible to provide a 3D digital map system for implementing a navigation and ground collision preventing method using 3D terrain information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-dimensional (3D) digital map system comprising:
   a Terrain Referenced Navigation (TRN) module configured to receive data from EGI (Embedded GPS/INS), a radio-altimeter (RALT) and a map database, correct the data to perform accurate navigation computation, and output the corrected data;
   wherein the TRN module includes:
      a data synchronization function configured to internally store information received from the EGI and the radio-altimeter through a time tag;
      a Bayesian filter configured to estimate a current latitude and longitude of the aircraft using the data synchronized by the data synchronization function and Digital Terrain Elevation data (DTED);
      a Kalman filter configured to receive the estimated latitude and longitude and correct aircraft status data of the EGI; and
      a switch configured to check the estimation state of the Kalman filter and bypass the data of the EGI or output the data of the EGI corrected by the Kalman filter;
   a Collision Avoidance Warning (CAW) module configured to generate a warning against collision of an aircraft with the ground or an obstacle using the corrected data, a 3D terrain database and an obstacle database;
   wherein the CAW module includes:
      an aircraft prediction trajectory generation module configured to receive maximum allowable load coefficient information outputted from a flight control module;
      a near terrain generation module configured to receive high-resolution satellite image terrain data stored in a Digital Moving Map (DMM) module, data of an obstacle database and data of an anti-air threat database;
      a search range setting module configured to receive the latitude, longitude, height and velocity of the aircraft and attitude information of the aircraft, which are outputted from a navigation system, set a search range, and output the information to the near terrain generation module or the aircraft prediction trajectory generation module;
      a terrain-and-trajectory comparison module configured to receive and analyze the data of the databases and the aircraft status outputted from the near terrain generation module and the aircraft prediction trajectory generation module: and
      a status recognition module configured to output various warnings according to the analyzed data of the databases and aircraft status;
   a Terrain Following (TF) module configured to generate a terrain following trajectory of the aircraft using the corrected data, the 3D terrain database and the obstacle database:
   wherein the TF module further includes an excess thrust computation module configured to determine a maximum climbing rate, a constant-slope module for simplifying a terrain, and a moving average module considering a turn rate; and
   a Passive Ranging (PR) module configured to receive the 3D terrain database and line-of-sight (LOS) information of a target and calculate distance and position information of the target located on the ground;
      wherein the PR module further includes a line-of-sight ranging module and a coordinate ranging module.

* * * * *